Nov. 3, 1959  HANS-JOACHIM M. FÖRSTER  2,911,212
POWER-DRIVEN WINDOW-ACTUATING MECHANISM FOR MOTOR VEHICLES
Filed June 30, 1955
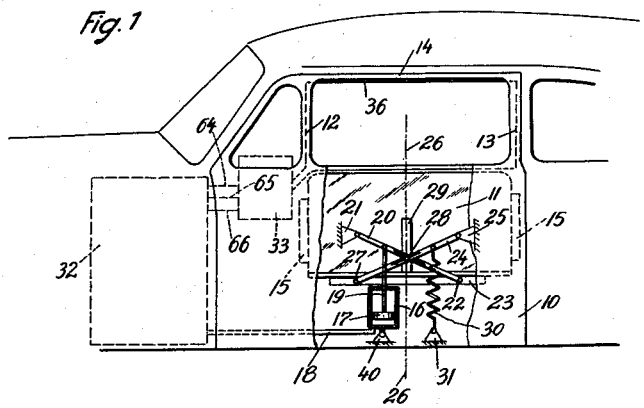
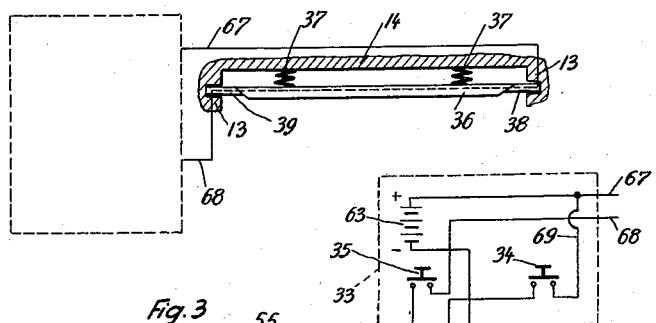
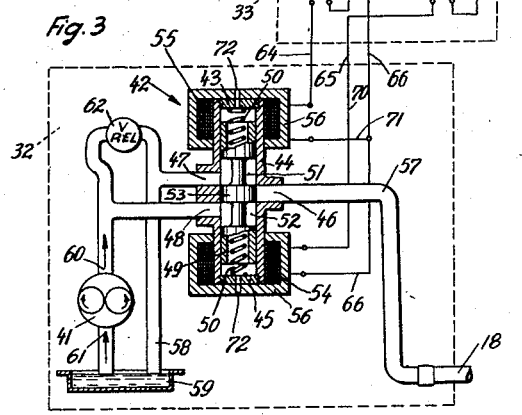
Inventor
HANS-JOACHIM M. FÖRSTER
BY Dicke and Craig
ATTORNEYS.

United States Patent Office 2,911,212
Patented Nov. 3, 1959

2,911,212

POWER-DRIVEN WINDOW-ACTUATING MECHANISM FOR MOTOR VEHICLES

Hans-Joachim M. Förster, Stuttgart-Bad Cannstatt, Germany, assignor to Daimler-Benz Aktiengesellschaft, Stuttgart-Unterturkheim, Germany Application June 30, 1955, Serial No. 519,140

Claims priority, application Germany July 1, 1954

6 Claims. (Cl. 268—125)

My invention relates to a power-driven window-actuating mechanism for motor vehicles.

It is the object of my invention to provide safety means ensuring that the window pane performing its closing movement will not inflict injury upon a passenger who accidentally sticks his head out of the window or sticks his hand out while the window pane is being closed by a power-driven actuator.

Prior mechanisms for automatically opening or closing windows which lately have come into more general use in automobiles have sometimes led to accidents in that the closing motion of the window pane initiated by actuation of an electrical switch was not stopped in time when any object, or the hand of a passenger, or the like had been accidentally placed above the leading edge of the pane and, therefore, was clamped between the leading edge of the pane and the window frame.

It is another object of my invention to provide an automatic mechanism for opening or closing a window which is simple and reliable in operation and requires but little service.

Further objects of my invention will appear from the detailed description of a preferred embodiment thereof following hereinafter with reference to the accompanying drawings. It is to be understood, however, that the phrases and terminology used in such detailed description serve the sole purpose of illustrating the invention rather than that of restricting or limiting the same. The features of novelty for which protection is sought are set forth in the accompanying claims. In the drawings, Fig. 1 is a diagrammatic elevation of a motor vehicle having a door provided with a window and with the novel power-driven means for opening and closing the same, the outer panels of the door being shown broken away to expose the fluid-operable actuator for the window pane, a pressure fluid control unit for the actuator and an electrical control unit being diagrammatically indicated by dotted lines, Fig. 2 is a partial sectional elevation of the upper portion of the window frame, and Fig. 3 represents the pressure fluid control unit including a control valve shown in section, the electrical control unit, and the wires connecting the same.

The door 10 of the motor vehicle shown in Fig. 1 is constituted by a sheet metal structure forming a window frame and guideways 15 adapted to slidably accommodate and guide a window pane 11 in a direction between an open position shown and a closed position. The window frame includes a pair of lateral frame members 12 and 13 and an upper frame member 14 which extends transversely to the direction of travel of the window pane and confines the opening of the window along the position assumed by the upper edge of the window pane when the same is closed.

On the structure 10 there is mounted a power-driven actuator which is connected with the pane 11 and adapted to move the same along the guideways 15. In the embodiment shown, the actuator includes a cylinder 16 adapted to be fed by a pressure fluid supplied by a source of pressure, a piston 17 movable in the cylinder 16, and a flexible duct 18 connecting the cylinder 16 with the pump. In the embodiment shown, the cylinder 16 is pivotally connected to a bracket 40 fixed to the sheet metal structure of the door 10 near the lower edge thereof. The piston rod 19 which extends upwardly out of the cylinder 16 is connected to a link 20 between the ends thereof, one end of the link being pivoted to a bracket 21 secured to the door structure 10 and the other end of the link having a pin 22 slidably engaging a horizontal channel bar 23 which is fixed to the lower horizontal edge of the window pane 11. Therefore, upward movement of the piston 17 under the pressure exerted by suitable pressure fluid, such as oil, charged into the lower end of the cylinder 16 will rock link 20 anti-clockwise causing pin 22 to lift the channel bar 23 and the window pane 11 into closing position.

In order to guide the pane parallel to itself and to prevent it from jamming between the guideways 15, a second link 24 is arranged symmetrically to link 20 with respect to a vertical transverse central plane of the window indicated by the dash-dotted line 26. The right hand end of link 24 is pivoted to a bracket 25 secured to the sheet metal structure of door 10, while the left hand end of link 24 has a pin 27 engaging the channel bar 23. The ends of a transverse pin 28 which extends through longitudinal slots of the links 20 and 24 are guided in vertical guideways 29 which extend along the plane 26 and are provided by the sheet metal structure of the door 10.

A helical spring 30 is extended between the link 24 and a bracket 31 fixed to the door 10 near the lower edge thereof. The spring 30, therefore, tends to rock link 24 in anti-clockwise direction to thereby lower the window pane 11. A pressure fluid control unit 32, which later will be described in detail, includes a source of pressure fluid and a valve adapted to alternatively connect duct 18 either to such source or to a fluid reservoir. In the latter case the spring 30 will lower the window depressing piston 17 and causing the fluid included in the cylinder below the piston to be discharged through duct 18 into the reservoir.

The pressure fluid control unit 32 is controlled by an electrical control unit 33 which includes switching means disposed near the driver's seat for convenient manual operation.

The two units 32 and 33 are shown in detail in Fig. 3 on an enlarged scale. In the embodiment shown, the switching means comprises a pair of push button switches 34 and 35. Normally the duct 18 is sealed by the valve included in unit 32 so that the fluid trapped beneath piston 17 keeps the window pane 11 in its set position, irrespective of the pull exerted by spring 30. When the driver depresses the push button 34 the valve in unit 32 puts duct 18 on exhaust thus permitting the spring 30 to open the window. Depression of push button 35 causes the valve to supply a fluid under pressure to duct 18 to thereby close the window.

For the purpose of preventing the actuator 16, 17 from exerting undue pressure on any object that might get in the way of the leading edge of the pane 11 during the closing movement of the latter, an end stop bar 36 is mounted on the window frame extending across the opening thereof adjacent to and coextensive with the frame member 14, i.e. adjacent to the position assumed by the leading edge of the pane 11 in closing position. As will appear from Fig. 2, the means for mounting the bar 36 include a pair of helical springs 37, the upper ends of which are fixed to the frame member 14 and the lower ends of which carry the bar 36 so that the latter is movable in the direction of motion of the window pane 11. The ends of the bar 36 are beveled and engage beveled faces of contact members 38, 39 which are fixed to the frame members 13. Normally the bar 36 is held by the springs 37 in contact with the members 38 and 39 establishing an electrical circuit therethrough. Should it happen, however, that any object gets in the way of the window pane while the same is being lifted, the object will be pushed upwardly by the window pane and will be pressed against the bar 36 causing the latter to move parallel to itself or in a tilting fashion to disengage at least one of the contact members 38, 39 thereby interrupting the electrical circuit. This causes the electrical control unit 33 to so control the fluid pressure control unit 32 as to stop the actuator 16, 17 thus preventing the leading edge of the window pane from exerting undue pressure on the object positioned between such leading edge and the bar 36.

An end stop switch is associated in a known manner with the actuator 16, 17 and adapted to cause the valve mechanism to seal the duct 18 when the window pane has reached its upper closed position. While such end stop switch may be provided in any suitable manner familiar to those skilled in the art, in the present embodiment such end stop switch is constituted by the elements 36, 38 and 39. For this purpose, the bar 36 is located in the path of the window pane 11. When the latter reaches its upper position it will engage the bar 36 and lift the same from the control members 38 and 39 to thereby interrupt the electrical circuit causing the valve mechanism to seal duct 18 and limit the upward movement of the window pane.

As shown in Fig. 3, the unit 32 includes a source of fluid under pressure, such as a motor-driven pump 41, and a magnetic valve 42. The valve comprises a tubular cylindrical housing 44 closed at both of its ends by cover plates 43, 45, such plates and the housing consisting of a non-magnetic material, such as brass. The housing 44 is provided with a central port 46 and a pair of ports 47 and 48 laterally offset with respect to port 46. A control plunger 49 axially movable in the cylindrical bore of housing 44 is normally centered therein by a pair of helical pressure springs 50, each spring being inserted between the bottom of an endwise recess of plunger 49 and the opposed cover plate 43, or 45 respectively. The plunger is provided with a pair of circumferential grooves 51 and 52 leaving land 53 therebetween which closes port 46 when the control plunger is centered. The ports 47 and 48 are spaced a distance substantially corresponding to the width of land 53.

Each end of the housing 44 is surrounded by an electrical coil 54, or 55 respectively. The flux produced by the coil is conducted by a casing 56 of a magnetic material, such as steel, which surrounds the associated coil and the end of the cylindrical housing 44 extending through an opening of the casing. Energization of the coil sets up a flux which extends through the plunger 49 and produces a force on the plunger pulling it into the coil and into contact with the associated cover 43, or 45 respectively. To permit such movement the covers 43 and 45 and the associated casings 56 are provided with vents 72.

Port 46 is connected by a pipe 57 with the flexible duct 18. Port 47 communicates with an exhaust pipe 58 leading to an oil reservoir 59. Port 48 communicates with the discharge port 60 of the pump 41, the intake port 61 of which communicates with the reservoir. A relief valve 62 is inserted between the discharge port 60 of the pump and the exhaust pipe 58.

The electrical unit 33 includes a source of current 63, the two press button switches 34, 35 mentioned heretofore, and electrical wires including three wires 64, 65 and 66 extending between the two units 32 and 33, a wire 67 leading from the positive terminal of the source of current 63 to the contact member 38, as shown in Fig. 2, and a wire 68 leading from switch 35 to the contact member 39, as shown in Fig. 2. Additional leads included in the electrical equipment will be referred to in the following explanation of the operation of the novel automatic window-actuating mechanism.

When the driver or any other person depresses push button 34, a circuit will be closed extending from the positive terminal of the source of current 63 through wire 67, wire 69, closed switch 34, wire 70, coil 54, and wire 66 to the negative terminal of the source of current. In this circuit coil 54 will be energized pulling plunger 53 downwardly contrary to the force exerted by spring 50. As a result, groove 51 will establish a communication between the ports 46 and 47 thus putting duct 18 through pipe 57 on exhaust. As explained hereinabove, this results in downward movement of the window pane under the force exerted by spring 30.

As soon as the operator releases push button 34 again the circuit described will be interrupted and the coil 54 will be de-energized permitting spring 50 to return the control plunger 49 to the centered position shown in Fig. 3 in which it seals port 46 thus arresting piston 17 and the window pane 11 connected therewith in set position.

Depression of push button 35 establishes an electrical circuit extending from the positive terminal of the source of current 63 through wire 67, contact member 38, safety bar 36, contact member 39, wire 68, switch 35, wire 64, coil 55, wire 71, and wire 66 to the negative terminal of the source of current 63. Thus, two safety switches formed by contacts 38 and 39 and bar 36 are connected in series in control of coil 55. In this circuit coil 55 will be energized setting up a flux which pulls the control plunger 49 upwardly into contact with cover 43 contrary to the force exerted by spring 50. Now groove 52 establishes a communication between the ports 46 and 48 admitting the oil under pressure fed by pump 41 to the cylinder 16 whereby the window pane will be raised.

As described hereinabove, the circuit just described will be interrupted should any object get in the way of the leading edge of the ascending window pane and be urged thereby against the safety bar 36 lifting the same from at least one of the contact members 38, 39.

When the operator releases push button 35 the circuit will be likewise interrupted de-energizing coil 55 and permitting the spring 50 to return the plunger to the neutral position shown in which it seals duct 18. In this condition, the oil fed by the pump 41 escapes through the relief valve 62 into the reservoir 59.

When the window pane reaches its topmost position it will lift the end stop bar 36 and thus cause the fluid-operable actuator to be deactivated or stopped and locked in position by the control plunger 49.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a power-driven window-actuating mechanism, the combination comprising a pane, a structure forming a window frame and guideways adapted to slidably accommodate and guide said pane with respect to said frame for movement in a direction from an open position to a closed position, an electrically controlled power-driven actuator mounted on said structure and connected with said pane and adapted to move the same along said guideways between said positions, electrical control means for said actuator, an end stop bar, means mounting the latter on said frame for movement in said direction, said bar extending across the opening thereof adjacent to the position assumed by the leading edge of said pane in said closed position, and switch means controlled by movement of said bar in the window-closing direction and adapted to stop said actuator thereby preventing said pane from exerting undue pressure on any object getting between said leading edge of said pane and said bar at any point along the length of the bar and tending to block closure of the window, said switch means comprising an electrical contact carried by said frame adjacent each end of said bar and a contact carried at each end of the bar for movement thereby and cooperating with said first-mentioned contacts to form two switches, means for actuating each of said switches to open position by movement of the respective end of said bar in window-closing direction, and means for connecting said switches in series with each other in circuit with said control means to stop said actuator during closing movement of said pane when either of said switches is opened.

2. The combination claimed in claim 1 in which said bar extends in the path of said pane and constitutes an end stop means for deactivating said actuator when the pane reaches its closed position.

3. In a power-driven window-actuating mechanism, the combination comprising a pane, a structure forming a window frame and guideways adapted to slidably accommodate and guide said pane with respect to said frame for movement in a direction from an open position to a closed position, said window frame including a frame member extending transversely of said direction and confining the opening of said window adjacent to the position assumed by the leading edge of said pane in said closed position, a power-driven actuator mounted on said structure and connected with said pane and adapted to move the same along said guideways between said positions, and end stop bar, means mounting the latter on said frame in position within said opening coextensive with said frame member for movement in said direction, a pair of cooperating electrical contacts at each end of said bar mounted, respectively, on said bar and on said window frame for actuation by movement of the ends of said end stop bar in the window-closing direction, and electrical means controlled by said cooperating contacts at each end of said bar upon actuation thereof and cooperatively connected with said actuator and adapted to stop the latter in response to said actuation of said contacts thereby preventing said pane from exerting undue pressure on any object getting between said leading edge of said pane and said bar at any point along the bar tending to block closure of the window.

4. The combination claimed in claim 1 in which said power-driven actuator comprises a power-driven pump, a cylinder adapted to be fed by a pressure fluid supplied by said pump, a piston movable in said cylinder by said pressure fluid, and ducts connecting said cylinder with said pump, said means controlled by movement of said bar comprising said electrical contacts and an electromagnetic valve adapted to control said ducts to admit pressure fluid to said piston from said pump for window-closing movement of said pane only when said series-connected switches are in closed-circuit position.

5. In a power-driven window-actuating mechanism, the combination comprising a pane, a structure forming a window frame and guideways adapted to slidably guide said pane with respect to said frame for movement in a direction from an open position to a closed position, a spring cooperatively connected to said pane and to said structure and tending to move said pane to said open position, a fluid-operable actuator mounted on said structure and connected with said pane and adapted, when supplied with fluid under pressure, to move the same along said guideways towards said closed position in opposition to the force exerted by said spring, a source of fluid pressure, a magnetic three-way valve movable to three positions and associated with said source and said actuator and adapted in the first position to connect said source to said actuator for closing the window and adapted in the second position to seal said actuator to lock the window in said position and adapted in the third position to put said actuator on exhaust thereby enabling said spring to open said window, resilient means cooperatively connected to said valve and tending to move the same to said second position, a pair of coils associated with said magnetic valve, one coil when energized being adapted to move the same to said first position and the other coil when energized being adapted to move said valve to said third position, electrical circuit means including switching means adapted to optionally energize one or the other of said coils, and end stop means associated with said window frame and including a bar movable in said direction either parallel to itself or in a tilting fashion and extending across the opening of said window near the position assumed by the leading edge thereof in said closed position, an electrical contact carried by said frame adjacent each end of said bar, a contact structure carried at each end of said movable bar and cooperatively coordinated with said first-mentioned contacts in said circuit means and adapted to be moved by said bar either individually or simultaneously with respect to said first-mentioned contacts to control the circuit means to prevent energization of said one coil.

6. In a power-driven window-actuating apparatus as set forth in claim 1, further including spring means interposed between said window frame and said bar to bias the latter toward a position in which said switches are closed.

References Cited in the file of this patent

UNITED STATES PATENTS

| | | |
|---|---|---|
| 1,864,048 | McNutt | June 21, 1932 |
| 2,109,211 | Dyer | Feb. 22, 1938 |
| 2,276,698 | Pierce | May 17, 1942 |
| 2,311,864 | Parsons | Feb. 23, 1943 |
| 2,323,519 | Dean | July 6, 1943 |